(12) United States Patent
Van Swearingen (10) Patent No.: US 9,425,548 B2
(45) Date of Patent: Aug. 23, 2016

(54) RESILIENT COAXIAL CONNECTOR INTERFACE AND METHOD OF MANUFACTURE

(71) Applicant: CommScope Technologies LLC, Hickory, NC (US)

(72) Inventor: Kendrick Van Swearingen, Woodridge, IL (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 14/696,945

(22) Filed: Apr. 27, 2015

(65) Prior Publication Data

US 2015/0229070 A1    Aug. 13, 2015

Related U.S. Application Data (63) Continuation-in-part of application No. 14/074,016, filed on Nov. 7, 2013, now Pat. No. 9,048,527, which is a continuation-in-part of application No. 13/673,084, filed on Nov. 9, 2012, now Pat. No. 8,622,768.

(51) Int. Cl.

| | |
|---|---|
| *H01R 11/22* | (2006.01) |
| *H01R 13/11* | (2006.01) |
| *H01R 13/622* | (2006.01) |
| *H04B 5/00* | (2006.01) |

(Continued)

(52) U.S. Cl.
CPC .............. *H01R 13/622* (2013.01); *H01R 13/15* (2013.01); *H01R 24/44* (2013.01); *H04B 5/0012* (2013.01); *H01P 5/026* (2013.01); *H01R 13/17* (2013.01); *H01R 13/18* (2013.01); *Y10T 29/49123* (2015.01)

(58) Field of Classification Search
CPC ........ H01R 24/38; H01R 9/05; H01R 13/052; H01R 13/622; H01R 43/26
USPC .................................. 439/851, 825, 843, 578
See application file for complete search history.

(56) References Cited

U.S. PATENT DOCUMENTS

| | | |
|---|---|---|
| 3,281,756 A | 10/1966 | O'Keefe et al. |
| 3,601,776 A | 8/1971 | Curl |

(Continued)

FOREIGN PATENT DOCUMENTS

EP    2219267    8/2010

*Primary Examiner* — Hae Moon Hyeon
(74) *Attorney, Agent, or Firm* — Myers Bigel & Sibley, P.A.

(57) ABSTRACT

A resilient connector interface provided with an outer conductor contact with a plurality of outer conformable members and an inner conductor contact with a plurality of inner conformable members. The outer conformable members provided with an outer conductor coupling surface on an outer diameter and the inner conformable members provided with an inner conductor coupling surface on an inner diameter. An alignment portion is provided at a proximal end of the outer conformable member. The alignment portion may be sinuous with respect to a longitudinal axis of the outer conformable member. An elastic bias member is positioned between the outer conformable members and the inner conformable members biasing the outer conformable members outward and the inner conformable members inward. The outer conductor coupling surface and the inner conductor coupling surface may be covered with a dielectric material to form a capacitive coupling interconnection.

20 Claims, 11 Drawing Sheets

(51) Int. Cl.
   *H01R 13/15*   (2006.01)
   *H01R 24/44*   (2011.01)
   *H01P 5/02*   (2006.01)
   *H01R 13/17*   (2006.01)
   *H01R 13/18*   (2006.01)

(56) References Cited

U.S. PATENT DOCUMENTS

| | | |
|---|---|---|
| 4,046,451 A | 9/1977 | Juds et al. |
| 4,235,498 A | 11/1980 | Snyder |
| 4,824,400 A | 4/1989 | Spinner |
| 5,074,809 A | 12/1991 | Rousseau |
| 5,435,745 A | 7/1995 | Booth |
| 5,486,123 A | 1/1996 | Miyazaki |
| 5,595,499 A | 1/1997 | Zander et al. |
| 5,938,474 A | 8/1999 | Nelson |
| 6,024,609 A | 2/2000 | Kooiman et al. |
| 6,036,237 A | 3/2000 | Sweeney |
| 6,056,577 A | 5/2000 | Blanchet |
| 6,093,043 A * | 7/2000 | Gray .................... H01R 13/622 439/352 |
| 6,126,487 A | 10/2000 | Rosenberger |
| 6,267,621 B1 | 7/2001 | Pitschi et al. |
| 6,607,398 B2 | 8/2003 | Henningsen |
| 6,824,415 B2 | 11/2004 | Wlos |
| 6,827,608 B2 * | 12/2004 | Hall et al. |
| 6,908,114 B2 | 6/2005 | Moner |
| 7,077,700 B2 | 7/2006 | Henningsen |
| 7,275,957 B1 | 10/2007 | Wlos et al. |
| 7,294,023 B2 | 11/2007 | Schneider |
| 7,309,247 B1 | 12/2007 | Keating |
| 7,335,059 B2 | 2/2008 | Vaccaro |
| 7,347,727 B2 | 3/2008 | Wlos et al. |
| 7,351,101 B1 | 4/2008 | Montena |
| 7,435,135 B2 | 10/2008 | Wlos |
| 7,500,873 B1 | 3/2009 | Hart |
| 7,588,460 B2 | 9/2009 | Malloy et al. |
| 7,705,238 B2 * | 4/2010 | Van Swearingen ....... H01P 1/30 174/102 R |
| 7,798,848 B2 | 9/2010 | Islam |
| 7,803,018 B1 | 9/2010 | Islam |
| 8,174,132 B2 * | 5/2012 | Van Swearingen ...... H01G 4/01 257/532 |
| 8,317,539 B2 | 11/2012 | Stein |
| 8,388,377 B2 | 3/2013 | Zraik |
| 8,469,739 B2 | 6/2013 | Rodrigues et al. |
| 8,545,263 B2 | 10/2013 | Islam |
| 8,597,050 B2 | 12/2013 | Flaherty |
| 8,690,602 B2 | 4/2014 | Flaherty |
| 2003/0137372 A1 | 7/2003 | Fehrenbach et al. |

\* cited by examiner

RESILIENT COAXIAL CONNECTOR INTERFACE AND METHOD OF MANUFACTURE

CROSS REFERENCE TO RELATED APPLICATIONS

This application is a continuation-in-part of commonly owned co-pending U.S. Utility patent application Ser. No. 14/074,016, titled "COAXIAL CONNECTOR WITH CAPACITIVELY COUPLED CONNECTOR INTERFACE AND METHOD OF MANUFACTURE" filed 7 Nov. 2013 by Ronald Alan Vaccaro, Jeffrey D Paynter and Kendrick Van Swearingen, hereby incorporated by reference in its entirety, which is a continuation-in-part of commonly owned U.S. Utility patent application Ser. No. 13/673,084, titled "CONNECTOR WITH CAPACITIVELY COUPLED CONNECTOR INTERFACE" filed 9 Nov. 2012 by Kendrick Van Swearingen, Ronald Alan Vaccaro, James P. Fleming and Jeffrey D Paynter, issued as U.S. Pat. No. 8,622,768 on 7 Jan. 2014 and hereby incorporated by reference in its entirety.

BACKGROUND

1. Field of the Invention

This invention relates to electrical cable connectors. More particularly, the invention relates to Radio Frequency (RF) coaxial connectors with resilient conductor contact surfaces between signal conducting portions of the connection interface.

2. Description of Related Art

Coaxial cables are commonly utilized in RF communications systems. Coaxial connectors may be applied to terminate coaxial cables, for example, in communication systems requiring a high level of precision and reliability.

Connector interfaces provide a connect/disconnect functionality between a cable terminated with a connector provided with the desired connector interface and a corresponding connector with a mating connector interface mounted on an apparatus or a further cable. Prior coaxial connector interfaces typically utilize a rigid outer conductor contact surface seated by compression of the mating contact surfaces against one another and an inner conductor contact surface comprising a spring finger basket biased to engage a center pin inserted therein.

Connector interfaces with flexible outer conductor contact surfaces are known; however, these may have relatively weak interconnection retention and/or additional mechanism such as movable lever actions to apply and/or release bias upon conventional spring finger elements of the contact surfaces to enable tool-less connection and disconnection, for example in "quick connect/disconnect" type connectors.

Passive Intermodulation Distortion (PIM) is a form of electrical interference/signal transmission degradation that may occur with less than symmetrical interconnections and/or as electro-mechanical interconnections shift or degrade over time, for example due to mechanical stress, vibration, thermal cycling, corrosion and/or material degradation. PIM is an important interconnection quality characteristic, as PIM generated by a single low quality interconnection may degrade the electrical performance of an entire RF system.

Competition in the cable connector market has focused attention on improving interconnection performance and long term reliability of the interconnection. Further, reduction of overall costs, including materials, training and installation costs, is a significant factor for commercial success.

Therefore, it is an object of the invention to provide a coaxial connector and method of interconnection that overcomes deficiencies in the prior art.

BRIEF DESCRIPTION OF THE DRAWINGS

The accompanying drawings, which are incorporated in and constitute a part of this specification, illustrate embodiments of the invention, where like reference numbers in the drawing figures refer to the same feature or element and may not be described in detail for every drawing figure in which they appear and, together with a general description of the invention given above, and the detailed description of the embodiments given below, serve to explain the principles of the invention.

DETAILED DESCRIPTION

The inventor has recognized that PIM may be generated at, in addition to the interconnections between the inner and outer conductors of a coaxial cable and each coaxial connector, the electrical interconnections across the connector interfaces of mating coaxial connectors. The inventor has analyzed PIM generation in prior connection interfaces and realized that rigid connection interfaces may generate varying levels of PIM depending upon contact mating surface conformity and/or environmental factors such as temperature or vibration, which may induce shifts of the mating surfaces with respect to one another.

Dielectric surface coatings and/or spacers that may be present between contact surfaces may degrade over time due to compression levels that may be applied and/or mechanical wear between the shifting mating surfaces, resulting in altered electrical characteristics of the mating surface interconnections, such as capacitance, that may be required to achieve capacitive rather than galvanic coupling.

In addition to varying levels of compression force that may be applied by different users, the inventor has also recognized that small variations in interpretation of standardized interface dimensions and/or manufacture methods between different connector manufacturers can lead to variances of the actual contact surface area between mating surfaces and/or result in skewed and/or angled rather than the parallel surface-to-surface or concentric mating. Further, dimensional allowances applied to the interconnection to allow for machining tolerances and/or for ease of interconnection mating may enable random air gaps to arise around the circumference or depth of a rigid interconnection, even when adequate compression levels are applied.

Exemplary coaxial connectors 2 with a resilient coaxial connector interface 4 are shown in FIGS. 1-4. The resilient connector interface 4 includes an outer conductor contact 6 with a plurality of outer conformable members 8 and an inner conductor contact 10 with a plurality of inner conformable members 12. The outer conformable members 8 have an outer conductor coupling surface 14 on an outer diameter and the inner conformable members 12 have an inner conductor coupling surface 16 on an inner diameter. An elastic bias member 18 is positioned between the outer conformable members 8 and the inner conformable members 12, biasing the outer conformable members 8 outward and the inner conformable members 12 inward.

Figures 5, 6, 7:
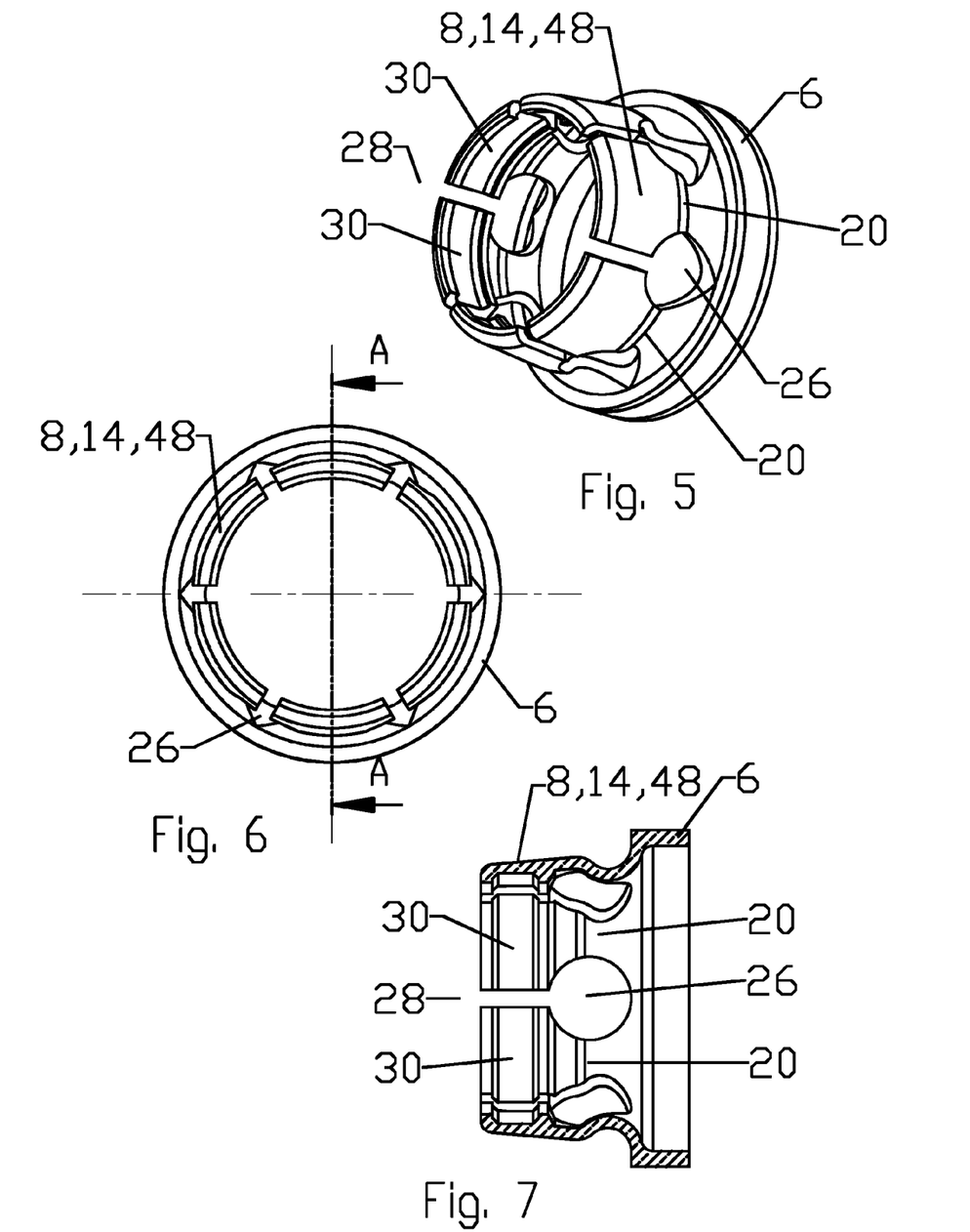
FIG. 5 is a schematic isometric side view of an exemplary outer conductor contact.
FIG. 6 is a schematic interface end view of the outer contact of FIG. 5.
FIG. 7 is a schematic cut-away side view along line A-A of FIG. 6.

As best shown on FIGS. 5-7, the outer coupling surface 14 is provided at a distal end and an alignment portion 20 is provided at a proximal end of the outer conformable members 8. The alignment portion 20 may be provided sinuous with respect to a longitudinal axis of the outer conformable member 8.

Figure 8:
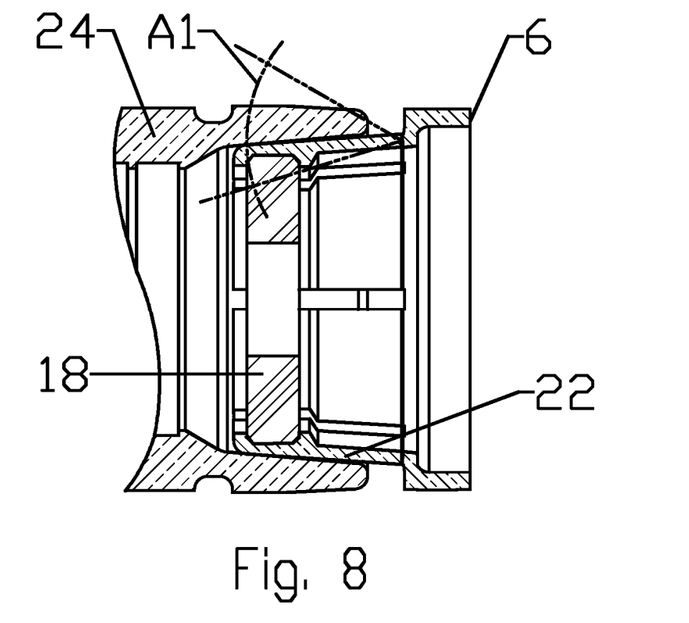
FIG. 8 is a schematic cut-away side view of an outer conductor contact, demonstrating pivoting movement of conventional spring fingers.
Figure 9:
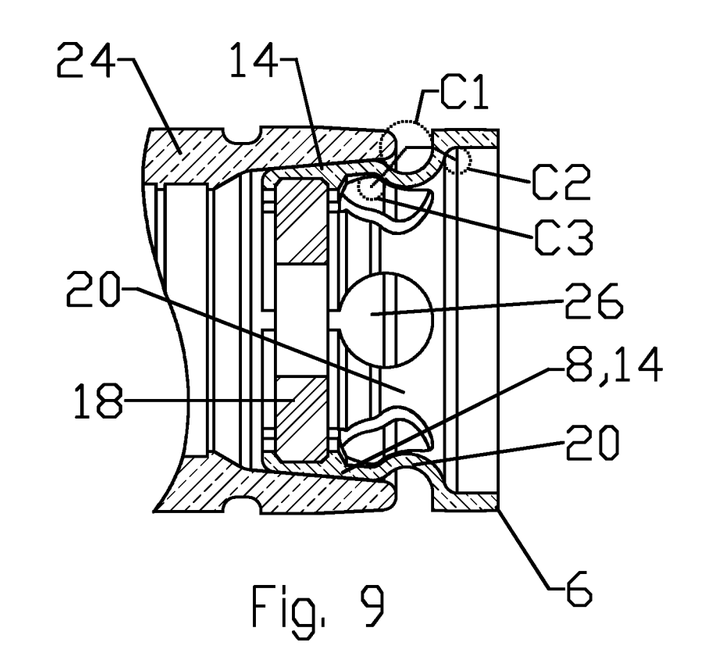
FIG. 9 is a schematic cut-away side view of an outer conductor contact with sinuous alignment portion enabling an adjustable alignment outer conformable member.

Because the single pivot point lever arm of a conventional spring finger 22, for example as shown in FIG. 8, bends typically along only a single arc A1, depending upon the distance to and angle of the corresponding mating surface of the opposing connector interface of a receiving portion 24, the contact surface of a conventional linear spring finger 22 may end up angled toe or heel from the corresponding mating surface, thereby opening an air gap and/or placing excess compression upon only a small portion of the intended connection surface. In contrast, the multiple curves providing the sinuous section of the alignment portion (best demonstrated by the arc segments along the alignment portion 20 of the three circles C1-C3, shown in FIG. 9) may enable the outer coupling surface 14 to shift in orientation along each of the curved surfaces of the alignment portion 20 so that the outer coupling surface 14 will self-align to more fully engage a corresponding mating surface of the receiving portion 24 over an increased range of connector interface to connector interface spacing and/or concentricity.

Figure 10:
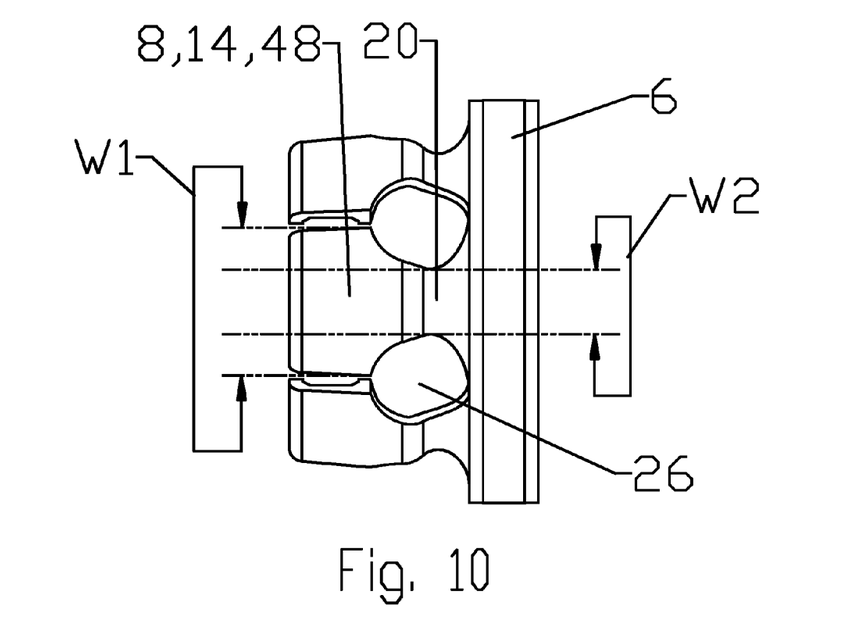
FIG. 10 is a schematic side view of an outer conductor contact demonstrating twist enabling width differentials between the alignment portion and the outer conductor coupling surface.
Figure 11:
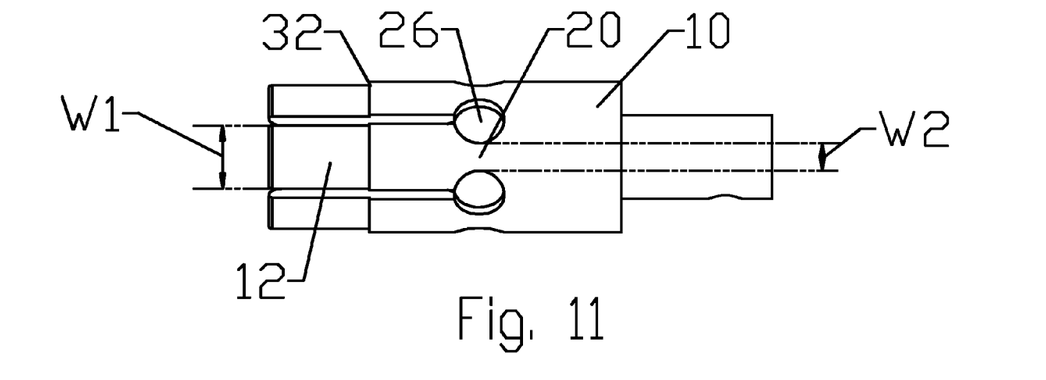
FIG. 11 is a schematic side view of an inner conductor contact demonstrating twist enabling width differentials between the alignment portion and the inner conductor coupling surface.

Additional dynamic alignment of outer and inner conductor coupling surfaces 14, 16 may be obtained by forming the inner and/or outer conformable members with a minimum width W1 of the outer and inner conductor coupling surfaces 14, 16 that is greater than a minimum width W2 of their respective alignment portions 20, for example as shown in FIGS. 10 and 11. The outer and inner conformable members 8, 12 may be formed, for example, by providing a plurality of holes 26 in the alignment portion 20 of the outer conductor contact 6 and slotting the outer conductor contact 6 from an interface end 28 to each of the holes 26. Thereby, the individual inner and/or outer conformable members 12, 8 are able to twist about their longitudinal axis close to the resulting reduced material section of the alignment portion 20 as may be necessary to more fully seat the respective inner or outer coupling surfaces against their intended contact surfaces for example if parts of the connection interfaces are less than fully concentric and/or parallel with one another.

Figure 12:
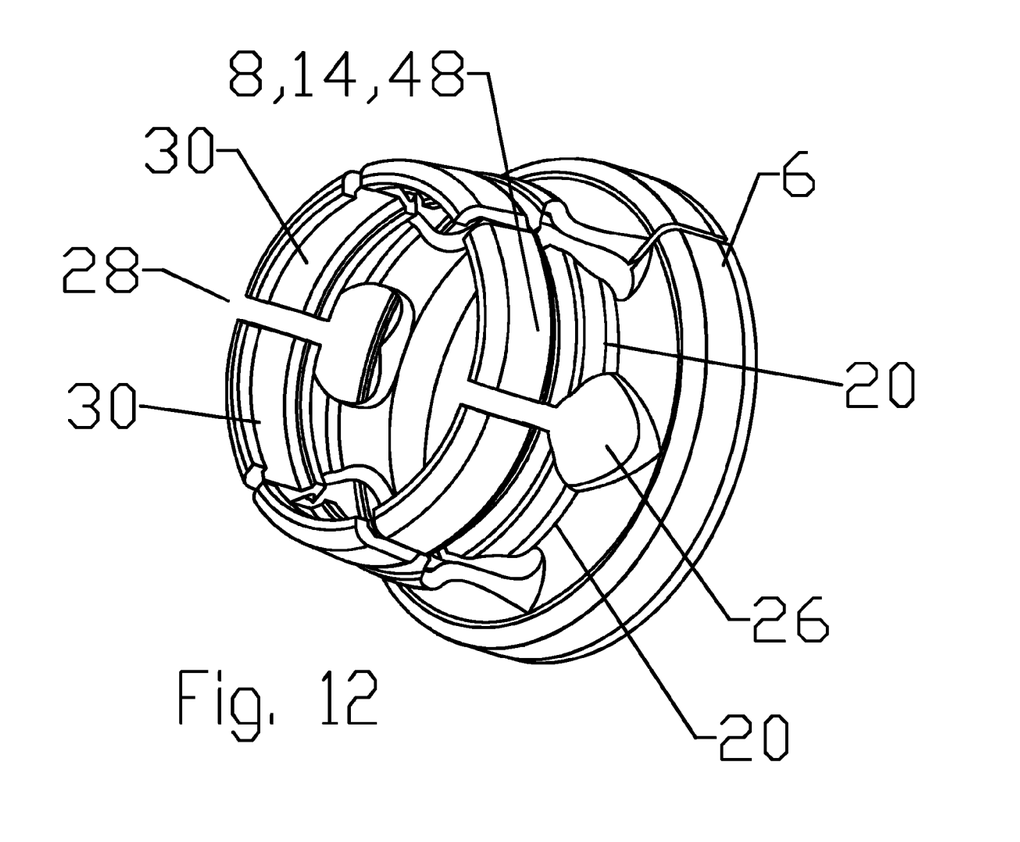
FIG. 12 is a schematic isometric view of an exemplary outer conductor contact formed via stamping.

The outer conductor contact 6 may be fabricated, for example by machining (see FIGS. 5-7) or stamping (see FIG. 12).

Figure 13:
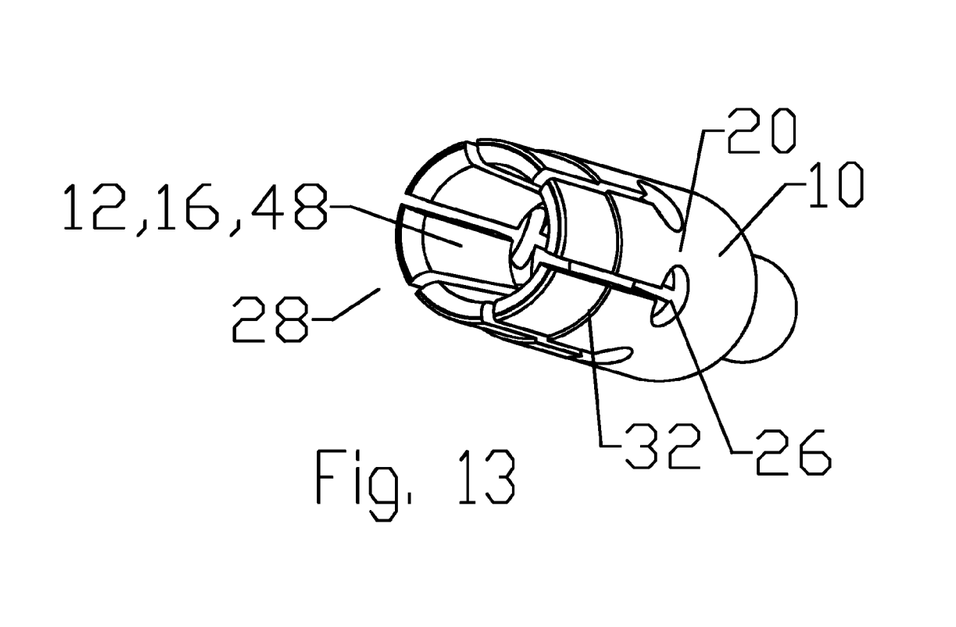
FIG. 13 is a schematic isometric view of an exemplary inner conductor contact.
Figures 14, 15, 16:
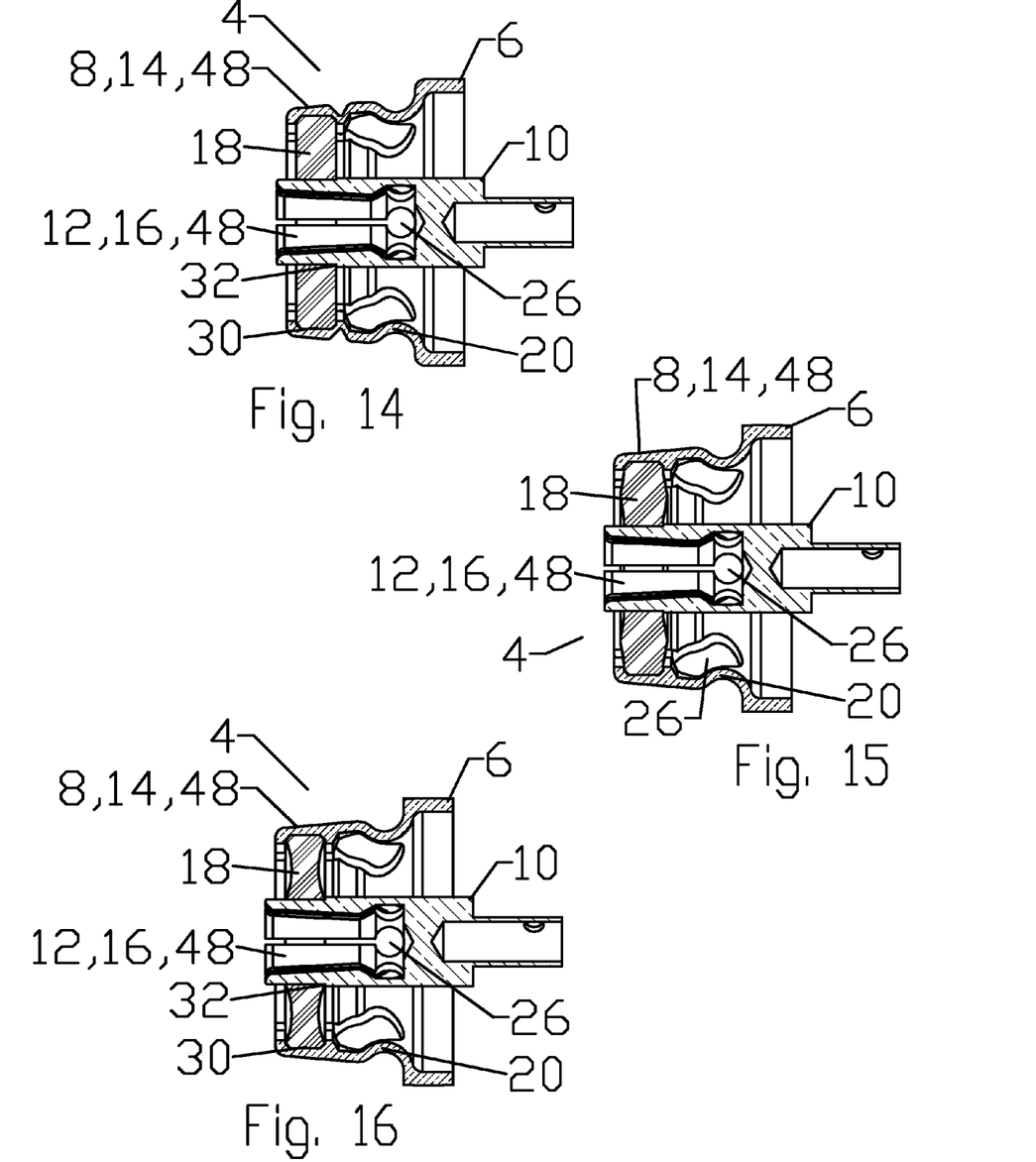
FIG. 14 is a schematic cut-away side view of an exemplary resilient coaxial connector interface with a generally rectangular cross section elastic bias member.
FIG. 15 is a schematic cut-away side view of an exemplary resilient coaxial connector interface with a generally barrel-shape cross section elastic bias member.
FIG. 16 is a schematic cut-away side view of an exemplary resilient coaxial connector interface with a generally hour-glass cross section elastic bias member.
Figures 17, 18, 19:
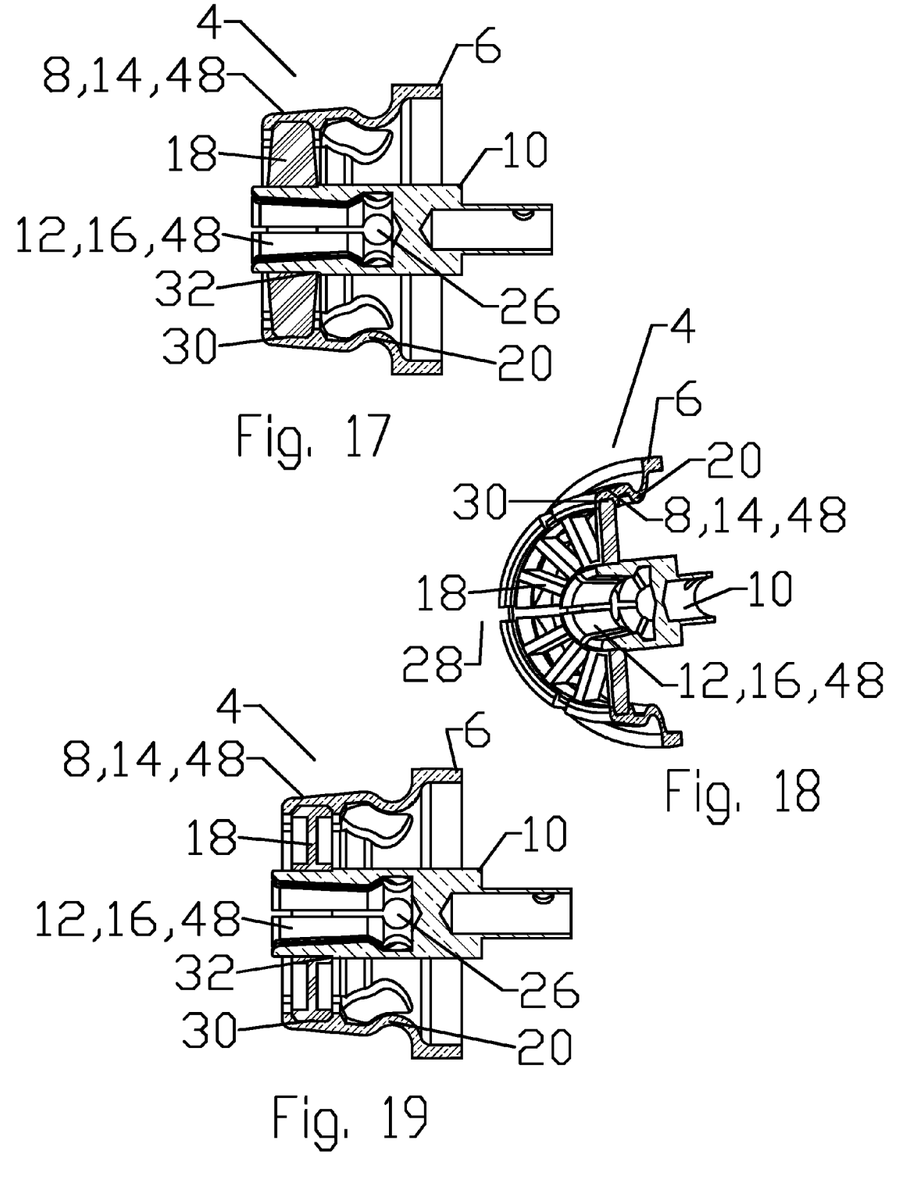
FIG. 17 is a schematic cut-away side view of an exemplary resilient coaxial connector interface with an outwardly tapered cross section elastic bias member.
FIG. 18 is a schematic isometric cut-away side view of an exemplary resilient coaxial connector interface with a radial compression support cross section elastic bias member.
FIG. 19 is a schematic cut-away side view of an exemplary resilient coaxial connector interface with an I-beam cross section elastic bias member.

Including a sinuous section in the alignment portions 20 of the outer conductor contact 6 also provides additional material to improve the overall bias the outer conformable members 8 may apply against the mating contact surfaces of the receiving portion 24. In addition, the elastic bias member 18, for example seated within a retention groove 30 provided at a distal end of an inner diameter of the outer conformable members 8 and/or seated against a retaining shoulder 32 provided upon an outer diameter of the inner conformable members 12 of the inner conductor contact 10, best shown in FIG. 13, may apply additional bias both outward and inward upon the outer and inner conductor coupling surfaces 14, 16, respectively.

The bias levels applied by the elastic bias member 18 may be tuned according to a desired bias level in either direction by adjusting the dimension and/or material of the elastic bias member 18. For direction specific bias tuning, a cross-sectional area of the elastic bias member 18 proximate each of the outer conformable members 8 and the inner conformable members 12 may be adjusted to be proportional to the desired bias towards each of the outer conformable members 8 and the inner conformable members 12, for example as shown in FIGS. 14-19. The dimensions of the elastic bias member may also be adjusted with respect to a resulting impedance discontinuity the presence of the elastic bias member may generate.

The elastic bias member 18 may be formed from an elastomeric material with suitable elasticity and/or dielectric characteristics, such as silicone or the like.

The resilient coaxial connector interface 4 may be applied to a connector embodiment, for example, by positioning the outer conductor contact 6 within a connector bore 34 (see FIGS. 20-23) of a connector body 36 and positioning the inner conductor contact 10 coaxial within the connector bore 34, supported by an insulator 38. The outer conductor contact 6 and inner conductor contact 10 are dimensioned to mate with a receiving portion 24 of a mating connector, the outer conductor coupling surface 14 seating against an inner diameter of an outer contact surface 40 of the receiving portion 24 and the inner conductor coupling surface 16 seating against an outer diameter of a center pin 42 of the receiving portion 24.

Figure 20:
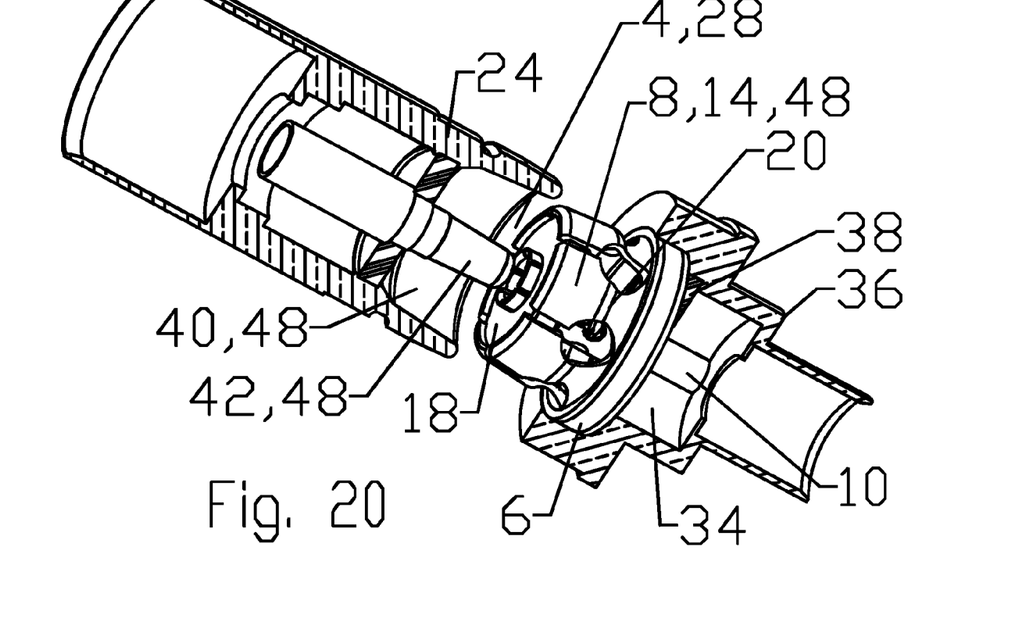
FIG. 20 is a schematic isometric partial cut-away view of a resilient coaxial connector interface aligned for interconnection with a receiving portion.
Figure 21:
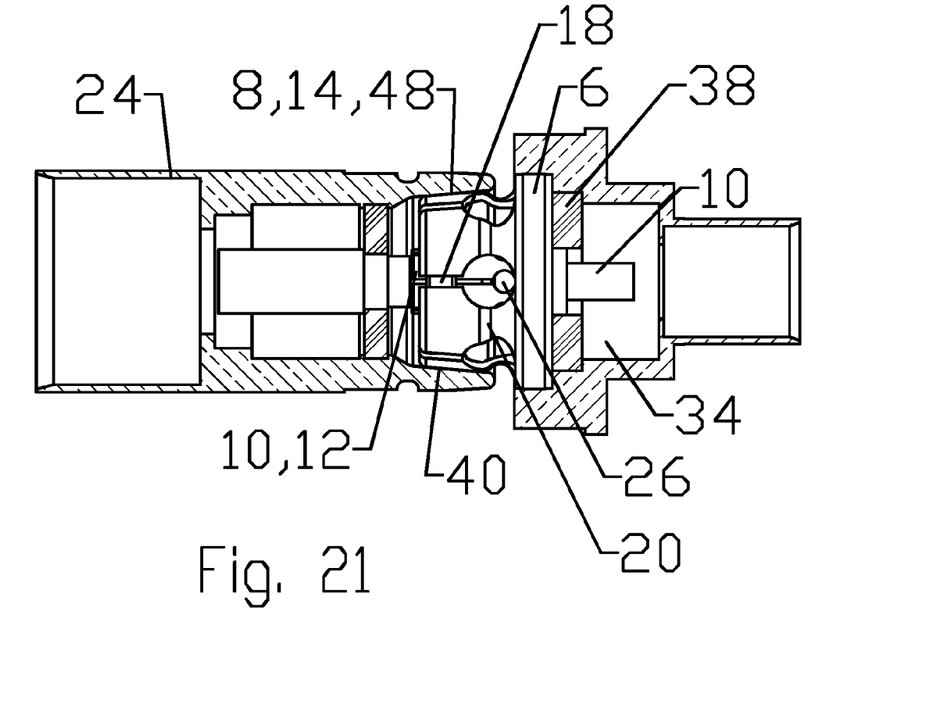
FIG. 21 is a schematic partial cut-away view of the resilient coaxial connector interface of FIG. 20, interconnected with the receiving portion.
Figure 22:
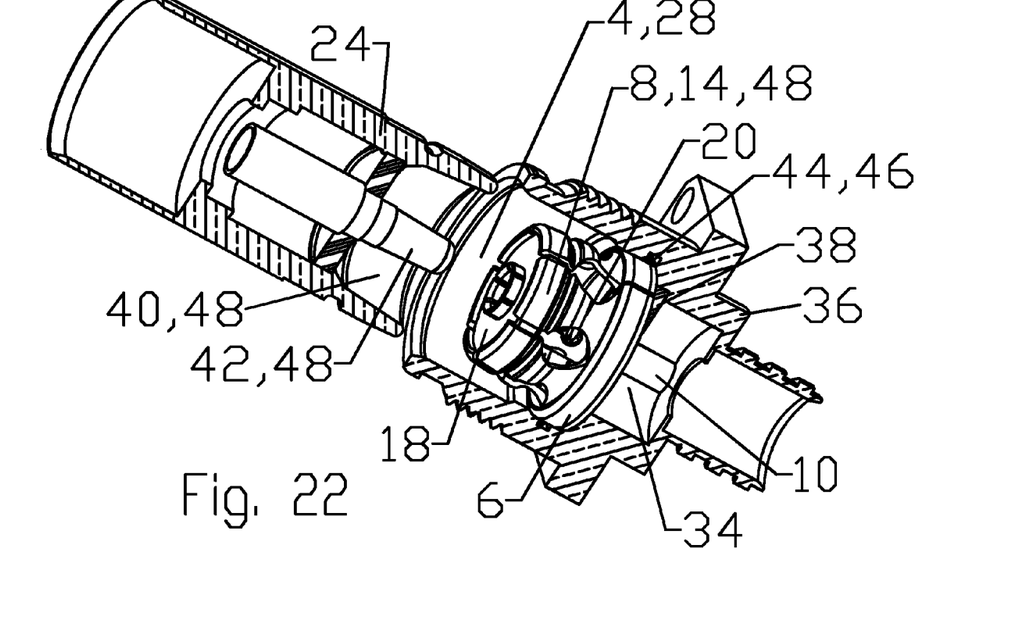
FIG. 22 is a schematic isometric partial cut-away view of an alternative resilient coaxial connector interface aligned for interconnection with a receiving portion.
Figure 23:
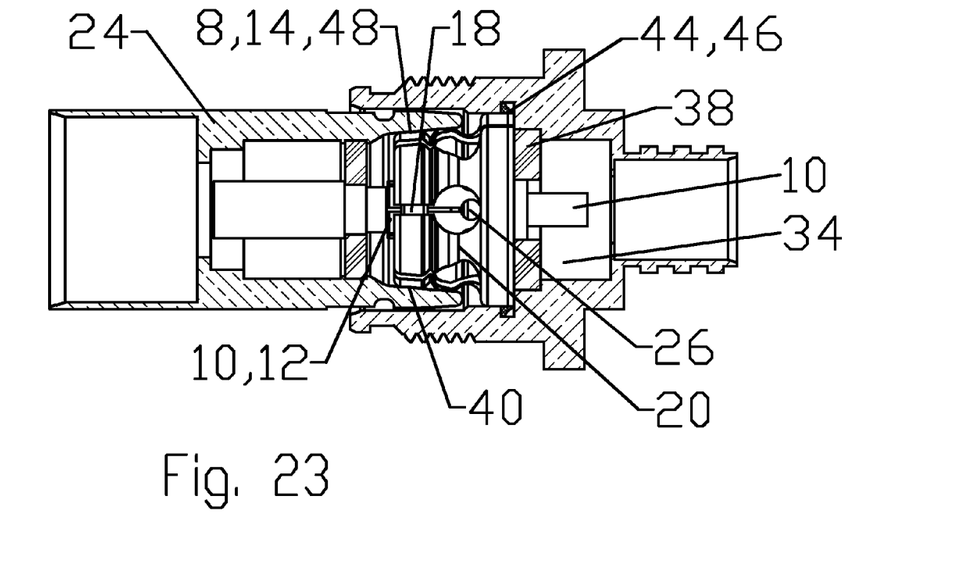
FIG. 23 is a schematic partial cut-away view of the alternative resilient coaxial connector interface of FIG. 22, interconnected with the receiving portion.

The outer conductor contact 6 may be retained within the connector bore 34 by press/interference fit, for example as best shown in FIGS. 20 and 21, and/or soldered in place for example as shown in FIGS. 22 and 23. Soldering of the outer conductor contact 6 within the connector bore 34 may be performed by providing the connector bore 34 with a solder pre-form groove 44, placing a solder pre-form 46 within the solder pre-form groove 44 and seating the outer conductor contact 6 within the connector bore 34, covering the solder pre-form groove 44. Once seated, the connector body 36 may be heated, for example via induction heating, until the solder pre-form 46 has melted. The soldering operation may be performed, for example, simultaneous with soldering of the outer conductor of a coaxial cable to the cable end of the connector body.

One skilled in the art will appreciate that the resilient coaxial connector interface 4 may provide enhanced interconnection characteristics suitable for either galvanic or capacitive coupling interconnections. Capacitive coupling between spaced apart conductor surfaces eliminates the direct electrical current interconnection between these surfaces that may otherwise be subject to PIM generation/degradation.

To configure the resilient coaxial connector interface 4 for capacitive coupling, the outer conductor coupling surface 14 and the inner conductor coupling surface 16 may be covered with a dielectric material 48. Alternatively, the contact surfaces of the receiving portion 24 that the inner and outer conductor coupling surfaces 14, 16 engage may be covered with the dielectric material 48. Thereby, inner and outer conductor contacts 10, 6 are insulated from direct contact with a mating connection interface of the receiving portion 24. That is, the presence of the dielectric material 48 ensures that there is no direct galvanic interconnection between the inner conductor or outer conductor electrical pathways across the resilient coaxial connection interface 4.

The dielectric material 48 applied may be provided, for example, as a ceramic or polymeric dielectric material. Examples of suitable polymeric dielectric materials include glass-filled polypropylene or polycarbonate. One example of a dielectric material coating with suitable compression and thermal resistance characteristics that may be applied with high precision at very thin thicknesses is ceramic or ceramic glass coatings. These coatings may be applied directly to the desired surfaces via a range of deposition processes, such as Physical Vapor Deposition (PVD) or the like. Ceramic and ceramic glass coatings have a further benefit of a high hardness characteristic, thereby protecting the coated surfaces from damage prior to interconnection and/or resisting thickness variation due to compressive forces present upon interconnection. The ability to apply extremely thin dielectric coatings, for example as thin as 0.5 microns or less, may reduce the surface area requirement of the separated conductor surfaces, enabling the overall dimensions of the connection interface to be reduced.

One skilled in the art will appreciate that a capacitive coupling interconnection may be optimized for a specific operating frequency band. For example, the level of capacitive coupling between separated conductor surfaces is a function of the desired frequency band(s) of the electrical signal(s), the surface area of the separated conductor surfaces, the dielectric constant of a dielectric spacer and the thickness of the dielectric material 48 (distance between the conductor surfaces separated by the dielectric material 48).

Figure 1:
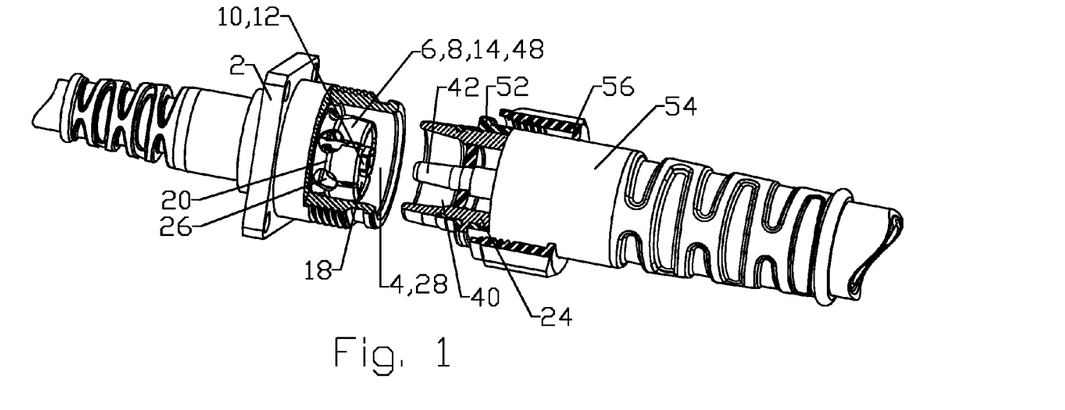
FIG. 1 is a schematic isometric partial cutaway side view of an exemplary receiving portion (male connector) aligned for interconnection with a bulkhead mount female connector with an exemplary resilient coaxial connector interface.
Figure 2:
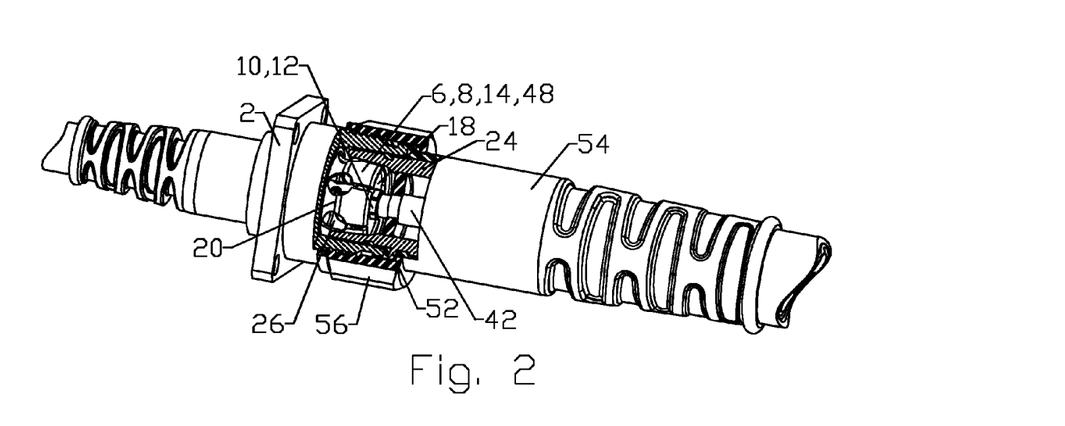
FIG. 2 is a schematic isometric partial cutaway side view of the female connector and receiving portion of FIG. 1 interconnected, cut-away to show the outer diameter of the outer conductor contact.
Figure 3:
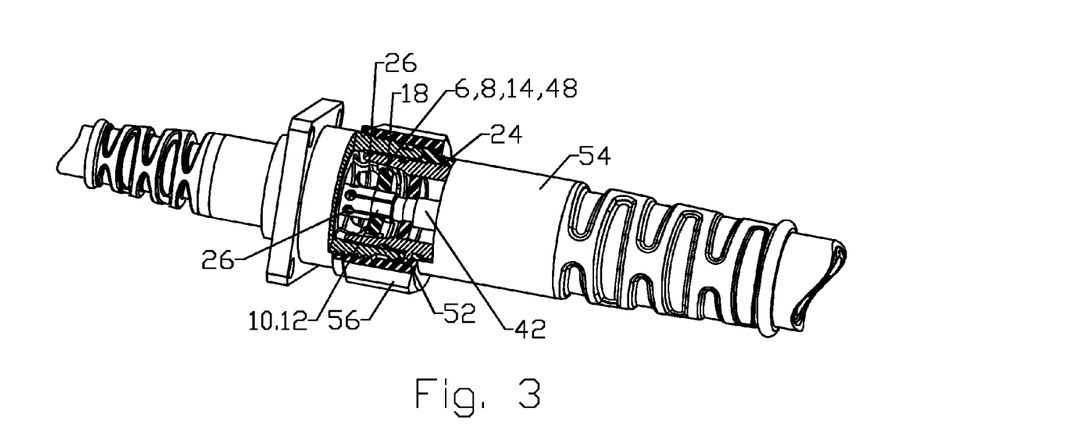
FIG. 3 is a schematic isometric partial cutaway side view of the female connector and receiving portion of FIG. 1 interconnected, cut-away to show the outer diameter of the inner conductor contact.
Figure 4:
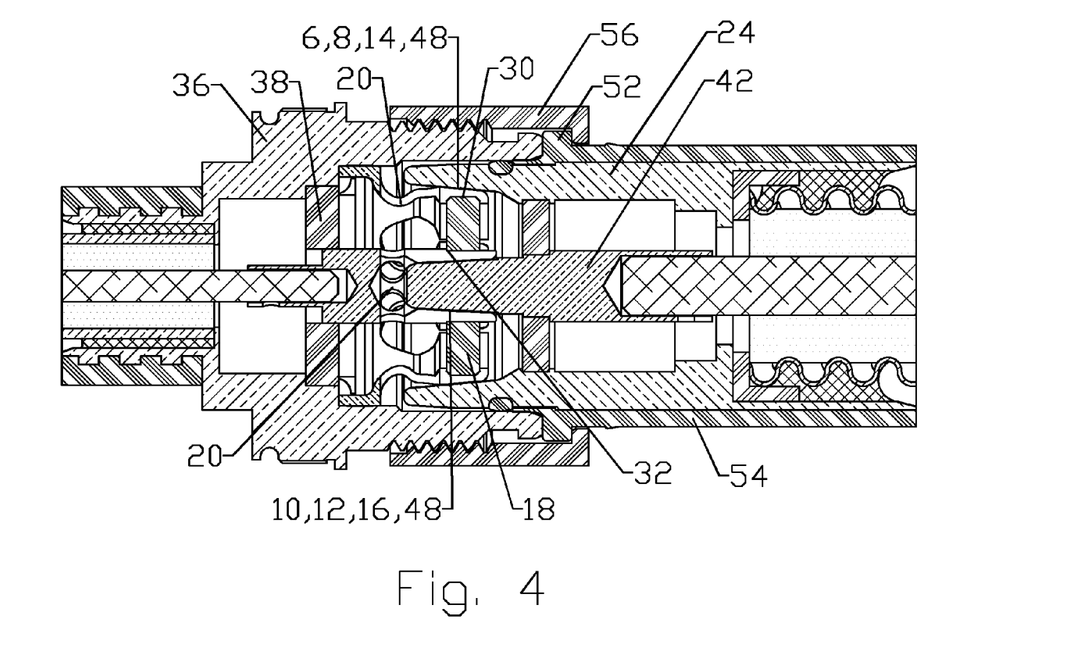
FIG. 4 is a schematic cross section side view of an exemplary resilient coaxial connector interface interconnected with a receiving portion.

As shown in the exemplary embodiment of FIGS. 1-3, an interface shoulder 52 of the receiving portion 24 provides an interconnection stop for the telescoping interconnection between the receiving portion 24 and the connector body 36. The interface shoulder 52 may be covered by dielectric material of an overbody 54, to space the receiving portion 24 apart from direct contact with the interface end of the connector body 36.

The telescopic mating between the receiving portion 24 and the connector body 36 of the embodiment of FIGS. 1-3 is secured by a releasable retainer 56. The releasable retainer 56 may be formed from a dielectric material, for example a fiber reinforced polymer such as glass filled polypropylene or polycarbonate. Therefore, the releasable retainer 56 does not create a galvanic electro-mechanical coupling between the connector body 36 and the receiving portion 24.

Where the additional wear and/or strength characteristics of a metal material releasable retainer are desired, for example where the releasable retainer 56 is a conventional threaded lock ring with inner diameter threads that couple with corresponding outer diameter threads of the connector body 36 to draw the connector body 36 and receiving portion 24 together and secure them in the interconnected position, a retainer dielectric spacer may be applied, between seating surfaces of the releasable retainer 56 and the connector body 36, to electrically isolate the releasable retainer 56 from the connector body 36. Alternatively, a metallic or other conductive material releasable retainer may be applied with a dielectric coating applied to the inner diameter threads thereof.

One skilled in the art will appreciate that the capacitive coupling connector interface may be applied in embodiments compatible with existing standardized coaxial connector interfaces, such as the 4.3-10, by adjusting the dimensions and/or contours of the outer and inner conductor coupling surfaces 14, 16 accordingly. Similarly, it should be appreciated that the alignment compensating characteristics of the resilient connector interface 4 may be particularly suited for use in blind mate interconnection configurations, for example as shown in FIGS. 20 and 21, wherein initial alignment of the mating surfaces during interconnection may be imprecise.

The dielectric material 48 has been demonstrated covering the conductor surfaces of the "female" portion of the pair of coaxial connectors. One skilled in the art will appreciate that the dielectric material 48 may be alternatively exchanged to seat upon the corresponding surfaces of the "male" receiving portion 24 and/or to both as a known equivalent. Thereby, a male or female type connector with a capacitive coupling connection interface may be interfaced with corresponding existing conventional female or male type connectors to obtain the same PIM reduction benefit. Other standardized and non-standard male or female connection interfaces may be similarly applied with the same result/benefits.

Figure 24:
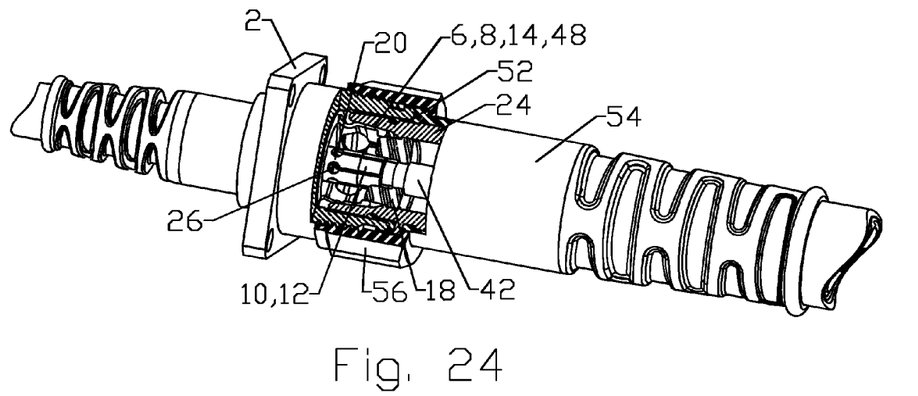
FIG. 24 is a schematic isometric partial cut-away view of an alternative resilient coaxial connector interface interconnected with a receiving portion, demonstrating exchange of the elastic bias member location to the receiving portion.

Similarly, the position of the elastic bias member 18 may be exchanged to seat at the "male" receiving portion 24, for example as shown in FIG. 24. To ease initial fit of the inner and outer conductor contacts 10, 6 in and around the corresponding positions on the elastic bias member 18 during interconnection, the elastic bias member 18 may be provided with sloped leading edges.

The application of capacitive coupling to the resilient coaxial connector interface 4 can enable reliable removable interconnectivity within an RF system wherein these interconnections are free of PIM. Further, resilient coaxial connector interface 4 also assists with accommodating variances in dimensional tolerances and/or alignment that may arise due to either manufacturing or environmental factors.

Coaxial coupling connectors adapted for mating with the standardized connection interface of existing coaxial connectors may enable cost efficient upgrade to new equipment and/or cabling providing the benefit of PIM free interconnections without requiring replacement and/or retrofitting of the entire RF system. Similarly, an RF system utilizing interconnections with a standardized capacitive coupled connector interface has the inherent flexibility of later being easily modified for operation with a conventional electromechanical interconnection should such become desired in view of changes to operating frequencies or the like.

| Table of Parts | |
|---|---|
| 2 | coaxial connector |
| 4 | resilient coaxial connector interface |
| 6 | outer conductor contact |
| 8 | outer conformable member |
| 10 | inner conductor contact |
| 12 | inner conformable member |
| 14 | outer conductor coupling surface |
| 16 | inner conductor coupling surface |
| 18 | elastic bias member |
| 20 | alignment portion |
| 22 | spring finger |
| 24 | receiving portion |
| 26 | hole |
| 28 | interface end |
| 30 | retention groove |
| 32 | retaining shoulder |
| 34 | connector bore |
| 36 | connector body |
| 38 | insulator |
| 40 | outer contact surface |
| 42 | center pin |
| 44 | solder pre-form groove |
| 46 | solder pre-form |
| 48 | dielectric material |
| 52 | interface shoulder |
| 54 | overbody |
| 56 | releasable retainer |

Where in the foregoing description reference has been made to materials, ratios, integers or components having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

I claim:

1. A resilient connector interface of a coaxial connector, comprising:
    an outer conductor contact with a plurality of outer conformable members;
    an inner conductor contact with a plurality of inner conformable members;
    the outer conformable members provided with an outer conductor coupling surface on an outer diameter and the inner conformable members provided with an inner conductor coupling surface on an inner diameter; and
    an elastic bias member positioned between the outer conformable members and the inner conformable members;
    the elastic bias member biasing the outer conformable members outward and the inner conformable members inward.

2. The resilient connector interface of claim 1, wherein the outer conductor coupling surface and the inner conductor coupling surface are covered with a dielectric material.

3. The resilient connector interface of claim 1, wherein the outer coupling surface is provided at a distal end of the outer conformable member and an alignment portion is provided at a proximal end of the outer conformable member; the alignment portion sinuous with respect to a longitudinal axis of the outer conformable member.

4. The resilient connector interface of claim 3, wherein a minimum width of the outer coupling surface is greater than a minimum width of the alignment portion.

5. The resilient connector interface of claim 1, wherein the resilient connector interface is dimensioned to mate with a receiving portion of a mating connector, the outer conductor coupling surface seating against an inner diameter of an outer contact of the receiving portion and the inner conductor coupling surface seating against an outer diameter of a center pin of the receiving portion.

6. The resilient connector interface of claim 1, wherein the outer conductor contact is retained within a bore of a connector body of the coaxial connector and the inner conductor contact is retained coaxial with the outer conductor contact within the bore of the connector body by an insulator.

7. The resilient connector interface of claim 1, wherein the elastic bias member is seated within a retention groove provided at a distal end of an inner diameter of the outer conformable members.

8. The resilient connector interface of claim 1, wherein the elastic bias member is seated against a retaining shoulder provided upon an outer diameter of the inner conformable members.

9. The resilient connector interface of claim 1, wherein the elastic bias member is dimensioned to provide a desired bias to each of the outer conformable members and the inner conformable members.

10. The resilient connector interface of claim 9, wherein a cross sectional area of the elastic bias member proximate each of the outer conformable members and the inner conformable members is proportional to the desired bias towards each of the outer conformable members and the inner conformable members.

11. A method for manufacturing a resilient connector interface of a coaxial connector, comprising:
provided an outer conductor contact with a plurality of outer conformable members in the coaxial connector;
providing an inner conductor contact with a plurality of inner conformable members in the coaxial connector;
an outer conductor coupling surface provided on an outer diameter of the outer conformable member; and
an inner conductor coupling surface provided on an inner diameter of the inner conformable members;
positioning an elastic bias member between the outer conformable members and the inner conformable members;
the elastic bias member biasing the outer conformable members outward and the inner conformable members inward.

12. The method of manufacturing a resilient connector interface of claim 11, wherein the outer coupling surface is formed at a distal end of the outer conformable member and an alignment portion is formed at a proximal end of the outer conformable member; the alignment portion sinuous with respect to a longitudinal axis of the outer conformable member.

13. The method of manufacturing a resilient connector interface of claim 12, wherein the outer coupling surface is formed with a minimum width of greater than a minimum width of the alignment portion.

14. The method of manufacturing a resilient connector interface of claim 11, further including covering the outer conductor coupling surface and the inner conductor coupling surface with a dielectric material.

15. The method of manufacturing a resilient connector interface of claim 11, wherein the elastic bias member is an elastomeric material.

16. The method of manufacturing a resilient connector interface of claim 11, wherein the outer conductor contact is machined.

17. The method of manufacturing a resilient connector interface of claim 16, wherein the outer conformable members are formed by forming a plurality of holes in an alignment portion of the outer conductor contact and slotting the outer conductor contact from an interface end to each of the holes.

18. The method of manufacturing a resilient connector interface of claim 11, wherein the outer conductor contact is stamped.

19. The method of manufacturing a resilient connector interface of claim 11, wherein the outer conductor contact is seated within a bore of a connector body of the coaxial connector and the inner conductor contact is seated within an insulator, the insulator seated within the bore, retaining the outer conductor contact coaxial with the inner conductor contact.

20. The method of claim 19, wherein the outer conductor contact is retained within the bore by providing the bore with a solder pre-form groove;
placing a solder pre-form within the solder pre-form groove;
seating the outer conductor contact within the bore, covering the solder pre-form groove; and
heating of the connector body until the solder pre-form has melted.

* * * * *